Patented Oct. 5, 1954

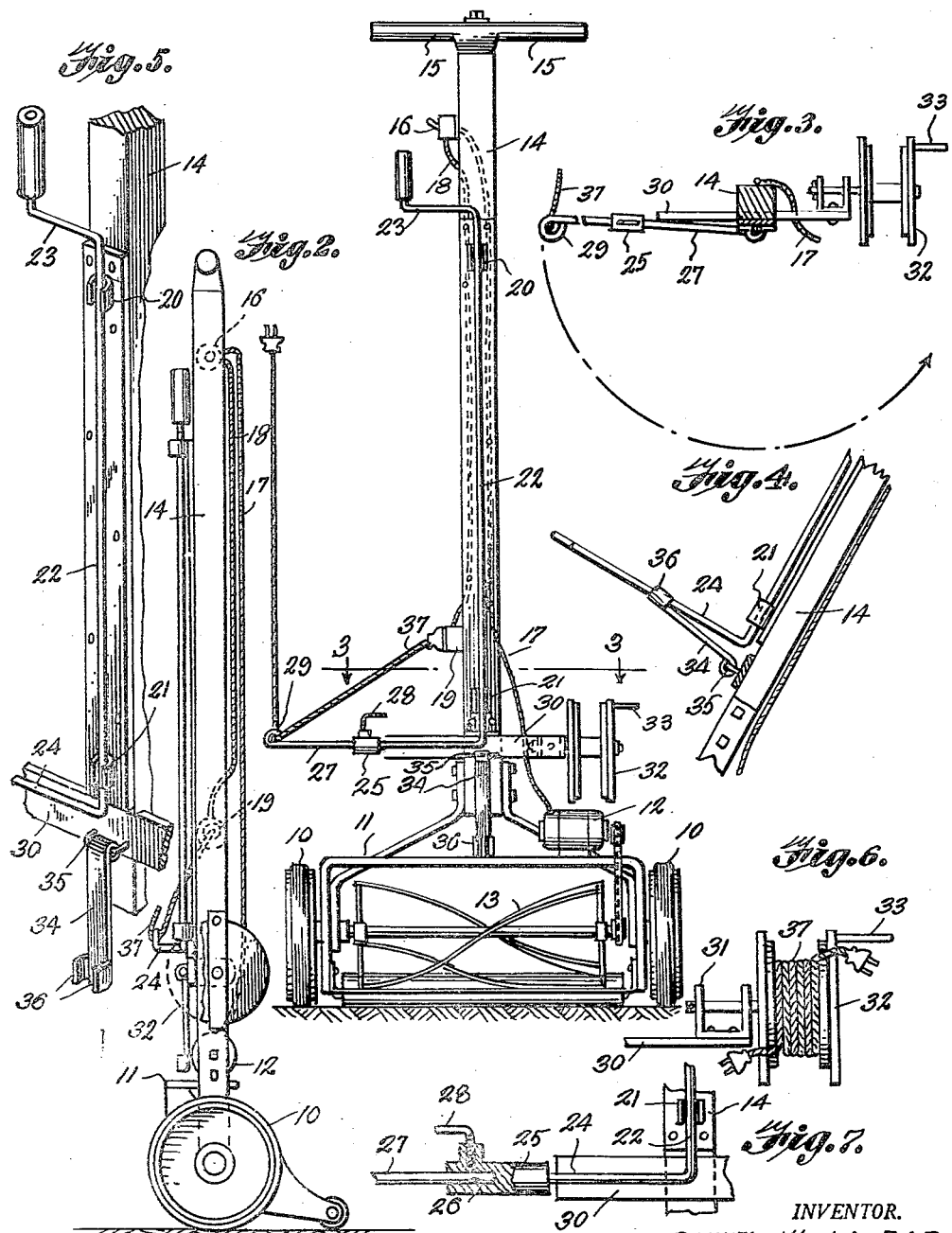

2,690,892

UNITED STATES PATENT OFFICE 2,690,892

ELECTRIC LAWN MOWER EXTENSION CORD BAR

Samuel W. La Bar, Porterville, Calif.

Application June 15, 1951, Serial No. 231,865

2 Claims. (Cl. 248—52)

1

The present invention relates to an electric lawn mower extension cord bar and it consists in the combinations, constructions and arrangements of parts herein described and claimed.

Generally there is provided a lawn mower adapted to be driven by an electric motor and the present invention comprises an attachment for such a lawn mower consisting of a horizontally extending bar affixed to a shaft which is pivotally mounted upon the conventional handle of the lawn mower and which is provided with an operating handle of its own at the upper end adjacent the customary handlebars. The horizontally extending support bar is provided with an eye in its outer end and the same may be swung either to the left or to the right at the convenience of the operator by manipulating the operating handle. An extension cord is adapted to be threaded through the eye and connected with a female connector plug attached to the handle of the lawn mower. An electrical cord extends upwardly from the female connector plug to a switch adjacent the handlebars and thence downwardly to the electric motor associated with the lawnmower. Means is provided for dismantling the extension bar so that the same may be stored in a minimum of space and means is also provided for clamping the extension bar in a forwardly extending position when the same is not in use. A reel is attached as a part of the invention to a support member affixed to the conventional handle of the lawnmower and may be utilized for reeling the extension cord when it is desired to store the apparatus.

It is accordingly an object of the invention to provide a device of the character set forth which is simple in construction, inexpensive to manufacture and yet effective and efficient in use.

Another object of the invention is the provision, in a device of the character set forth, of novel means for supporting an electrical extension cord in a position out of the way of the operator's feet while the apparatus is being used.

Another object of the invention is the provision, in a device of the character set forth, of a novel reel forming a part of the invention.

Other and further objects of the invention will become apparent from a reading of the following specification taken in conjunction with the drawing, in which:

Figure 1 is a front elevational view of an embodiment of the invention,

Figure 2 is a side elevational view thereof,

2

Figure 3 is a sectional view taken along line 3—3 of Figure 1,

Figure 4 is a fragmentary side elevational view illustrating a clamp member forming a part of the invention, Figure 5 is a fragmentary perspective view illustrating certain details of construction, Figure 6 is a fragmentary plan view, somewhat enlarged, of a reel forming a part of the invention, and Figure 7 is a fragmentary elevational view, partly broken away, illustrating details of construction of an extension arm forming a part of the invention.

Referring more particularly to the drawing, there is shown therein a lawnmower including supporting wheels 10, a frame 11 upon which is mounted an electric motor 12 for driving the conventional blades 13. An elongated handle 14 of conventional character is also a part of the lawnmower and is provided with the conventional handle bars 15 at its upper end.

A switch 16 is mounted upon the handle 14 immediately below the handle bars 15 and is connected by means of a cord 17 with the motor 12. The switch is also connected by means of a cord 18 with a female connector plug 19 which is attached to the handle 14 at a distance below the switch 16.

In an upper clamp member 20 affixed to the handle 14 and a lower clamp member 21 likewise affixed to the handle 14 there is revolubly mounted an elongated shaft 22 whose upper end has integrally formed therewith an operating handle 23 and whose lower end is provided with an integrally formed outwardly extending arm 24 having an enlarged portion 25 at its outer end which enlarged portion 25 is provided with a socket 26 extending from the outer end inwardly thereof. Removably mounted in the socket 26 is an extension bar 27 which may be locked in the socket 26 by means of a set screw 28 extending radially into the enlarged portion 25. There is formed in the outer end of the extension bar 27 an eye 29.

A horizontally extending support member 30 is affixed to the handle 14 beneath the lower end of the shaft 22 and has affixed at one end thereof a bracket 31 upon which is revolubly mounted a reel 32 provided with a handle 33 for operating the same.

A clamp member 34 is hinged centrally to the bar 30, as indicated at 35, and its free end is provided with a pair of integrally formed outwardly extending clamping jaws 36.

In operation, it will be apparent that when the operator of the lawnmower desires to use the same that he may connect a conventional extension cord 37 with the female connector plug 19 and thread the cord 37 through the eye 29 to a source of electrical energy. Thereupon the operator may turn the switch 16 to its "on" position to supply electrical energy to the motor 12 to revolve the blades 13 and the lawnmower may then be used in conventional manner. In order to keep the cord extension 37 from being entangled with the operator's feet, the extension arm 38 will hold the same away from the operator to one side and when the operator desires to move in another direction, it is only necessary to manipulate the handle 23 to thereby turn the extension arm 28 to a position extending outwardly to the other side of the handle 14. When the device is temporarily not in use, the operator may turn the shaft 22 by means of the handle 23 until the arm 24 projects straight ahead and at that time the member 34 may be brought upwardly until the clamp arms 36 engage the arm 24 to maintain in that position. When the operator has finished using the lawnmower he may utilize the reel 32 to wind the cord 37 thereon and he may also remove the extension arm 27 from the socket 26 and store the same in any convenient manner as, for example, an eye or clamp member which may be attached to the rear face of the handle 14 or to any other convenient spot upon the lawnmower.

While but one form of the invention has been shown and described herein, it will be readily apparent to those skilled in the art that many minor modifications may be made without departing from the spirit of the invention or the scope of the appended claims.

What is claimed is:

1. In a wheeled electrical appliance including an elongated handle, an electrical connector plug mounted on one side of said handle, an elongated extension cord adapted to be connected with said plug, the provision of a guide member for said cord mounted on said handle, said guide member comprising a shaft extending parallel to and pivotally mounted upon said handle, an arm extending horizontally from the lower end of said shaft, an operating handle at the upper end of said shaft, an eye at the outer end of the arm for receiving said cord slidably therein, and means for latching said arm in a forwardly extended position.

2. In a wheeled electrical appliance including an elongated handle, an electrical connector plug mounted on one side of said handle, an elongated extension cord adapted to be connected with said plug, the provision of a guide member for said cord mounted on said handle, said guide member comprising a shaft extending parallel to and pivotally mounted upon said handle, an arm extending horizontally from the lower end of said shaft, an operating handle at the upper end of said shaft, an eye at the outer end of the arm for receiving said cord slidably therein, and means for latching said arm in a forwardly extended position, said means including a latch member pivoted to said appliance handle and having a pair of clamp members formed in the outer end thereof.

References Cited in the file of this patent

UNITED STATES PATENTS

| Number | Name | Date |
|---|---|---|
| 1,493,223 | Peters | May 6, 1924 |
| 1,725,487 | Steinmetz et al. | Aug. 20, 1929 |
| 1,802,358 | Smith | Apr. 28, 1931 |
| 2,292,140 | Lofgren | Aug. 4, 1942 |
| 2,410,196 | Benthall | Oct. 29, 1946 |